US008724233B2

(12) United States Patent  (10) Patent No.: US 8,724,233 B2
Morimoto  (45) Date of Patent: May 13, 2014

(54) LENS POSITION CONTROL APPARATUS, IMAGING APPARATUS, AND CONTROL METHOD

(75) Inventor: Yosuke Morimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 59 days.

(21) Appl. No.: 12/948,630

(22) Filed: Nov. 17, 2010

(65) Prior Publication Data

US 2011/0063738 A1  Mar. 17, 2011

Related U.S. Application Data

(63) Continuation of application No. 12/334,159, filed on Dec. 12, 2008, now Pat. No. 7,852,568.

(30) Foreign Application Priority Data

Dec. 28, 2007 (JP) ................................. 2007-340393

(51) Int. Cl.
G02B 15/14 (2006.01)
G02B 7/28 (2006.01)
G02B 7/10 (2006.01)

(52) U.S. Cl.
CPC . *G02B 7/282* (2013.01); *G02B 7/10* (2013.01)
USPC ........................... 359/697; 359/696; 359/698

(58) Field of Classification Search
USPC .................................. 359/694–698, 822–824
See application file for complete search history.

(56) References Cited

U.S. PATENT DOCUMENTS

| 5,802,405 A * | 9/1998 | Sugimoto ........................ 396/82 |
| 2002/0105732 A1* | 8/2002 | Yumiki et al. ................. 359/696 |
| 2004/0114251 A1* | 6/2004 | Kaneda et al. ................ 359/694 |
| 2005/0078381 A1* | 4/2005 | Okawara ........................ 359/697 |
| 2006/0203357 A1* | 9/2006 | Irisawa ......................... 359/696 |
| 2006/0238904 A1* | 10/2006 | Nakashima et al. ............ 359/824 |

FOREIGN PATENT DOCUMENTS

| JP | 10-161005 A | 6/1998 |
| JP | 10191141 A1 | 7/1998 |
| JP | 2002-258138 A | 9/2002 |
| JP | 2003-149531 A | 5/2003 |
| jp | 2004-233892 A | 8/2004 |
| JP | 2006-343651 A | 12/2006 |
| JP | 2007-298708 A | 11/2007 |

* cited by examiner

*Primary Examiner* — Mahidere Sahle
(74) *Attorney, Agent, or Firm* — Canon USA Inc. IP Division

(57) ABSTRACT

It is provided an imaging apparatus including a plurality of motors configured to be driven to move lenses in synchronous with a drive pulse, a position detection unit configured to detect one of positions of the lenses moved by the driving of the plurality of motors, an operation unit configured to perform an output corresponding to an operation in response to the operation by a user, and a controller configured to receive the output from the position detection unit and control the plurality of motors. The controller supplies the number of drive pulses calculated based on a target position for moving the lens calculated based on the output from the operation unit and a lens position detected by the position detection unit.

23 Claims, 4 Drawing Sheets

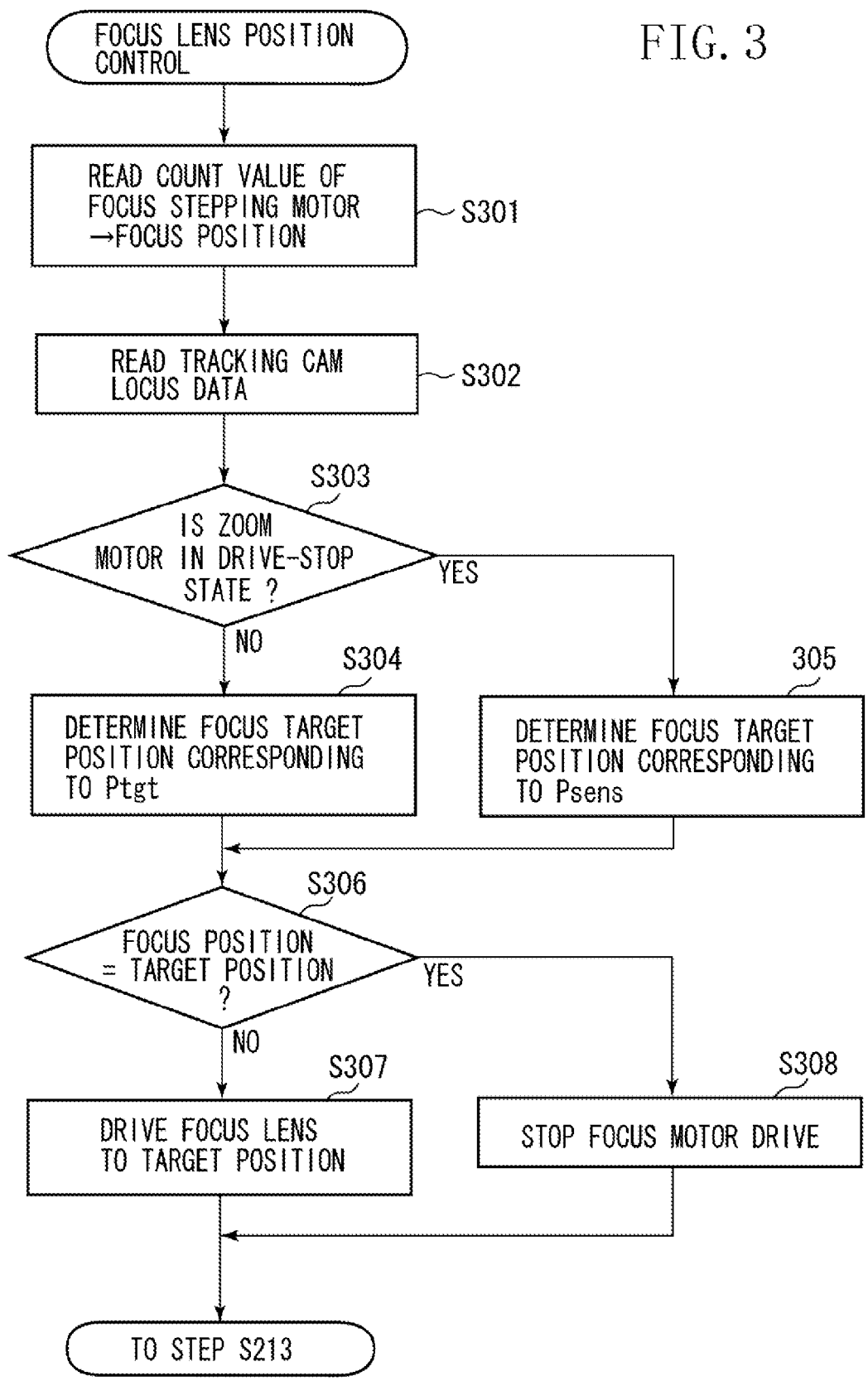

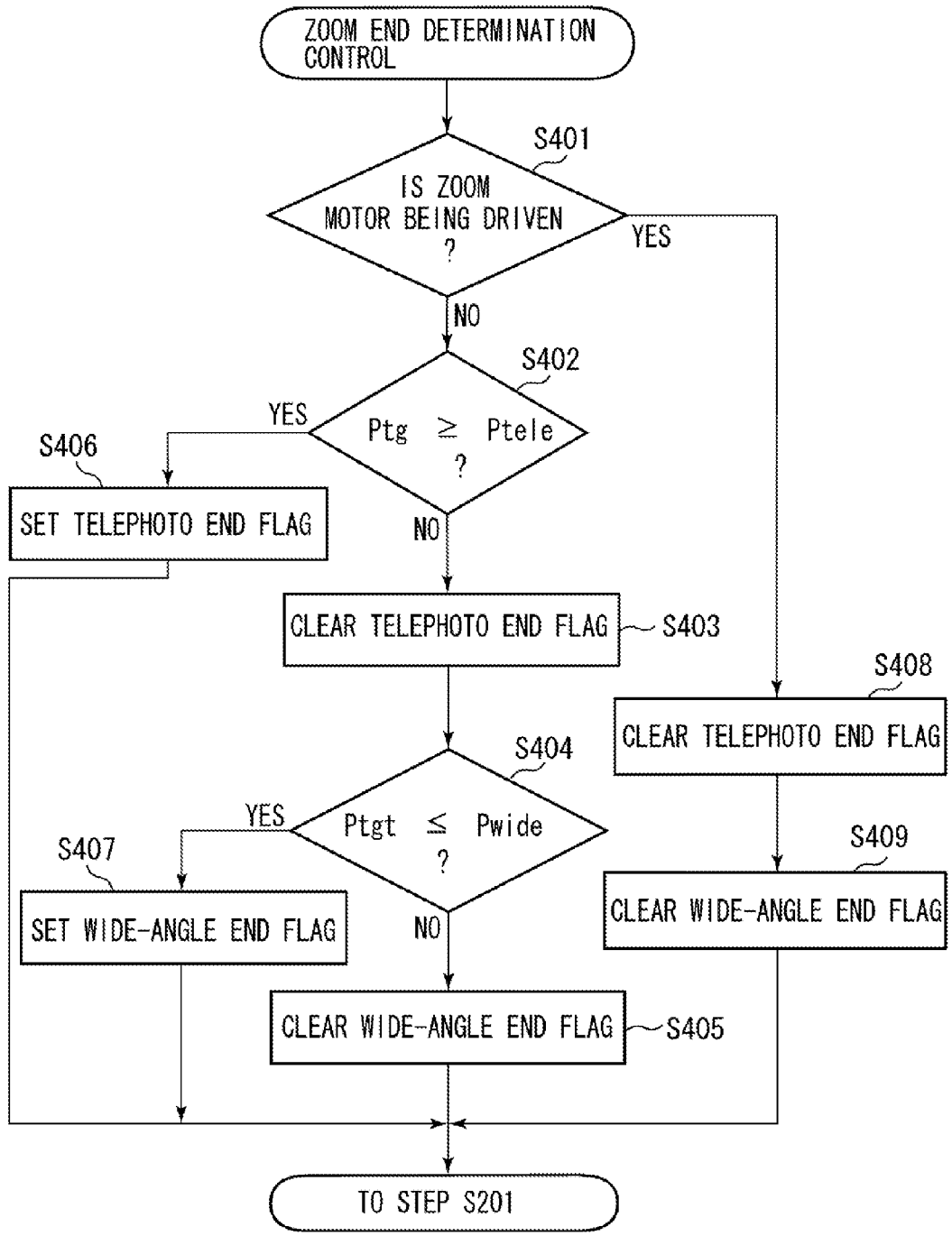

LENS POSITION CONTROL APPARATUS, IMAGING APPARATUS, AND CONTROL METHOD

CROSS REFERENCE TO RELATED APPLICATIONS

The present application is a CONTINUATION of co-pending U.S. patent application Ser. No. 12/334,159 filed Dec. 12, 2008, which claims foreign priority from Japanese Patent Application No. 2007-340393 filed on Dec. 28, 2007; the disclosures of both of the above-referenced applications are hereby incorporated by reference herein in their entirety.

BACKGROUND OF THE INVENTION

1. Field of the Invention

The present invention relates to a technique to control positions of lenses.

2. Description of the Related Art

In imaging apparatus such as a video camera and a still image camera, an actuator that operates in synchronization with a drive pulse such as a stepping motor, can be used as a drive source to control driving of a lens such as a variable power lens or a focusing lens at a high positional accuracy. In such an actuator, the lens is driven in an optical axis direction, frequently using a movement mechanism that includes a rotatable feed screw connected to a motor and a rack that engages with the screw.

To downsize the imaging apparatus, it is effective to reduce a drive torque of the stepping motor so as to decrease a power consumption and thereby to miniaturize a power supply battery. In addition, if the imaging apparatus is to be downsized, it is necessary to reduce the drive torque of the motor and to reduce the number of rotations. In the downsized apparatus, a microphone for recording a sound during an image recording and the motor that moves the lenses are closely placed. Accordingly, the drive torque and the number of rotations of the motor need to be reduced to prevent the imaging apparatus from recording a vibration and a noise of the motor. Further, by increasing a pitch of the feeding screw, a lens movement amount per motor rotation amount can be increased. Therefore, the lens can be moved at a high speed while the number of rotations of the motor is reduced.

However, if the torque of the motor is reduced as described above, a step-out phenomenon can occur. In other words, in a case where a drive load is large, even if a drive pulse is applied to the stepping motor, the motor cannot be driven. Therefore, it is difficult to accurately control the position of the lens. On the other hand, if a backlash removal pressure of the rack is decreased to reduce the drive load, a so-called tooth skipping occurs, in which the rack runs off a thread of the screw only with a slight shock. Then, similar to the above case, the position of the lens is not accurately controlled. Further, if the pitch of the feeding screw is increased as described above, a resolution at a stop point of the lens becomes low, and the lens position control accuracy is decreased.

To solve the above problems, it has been proposed to provide a position sensor to detect a position of a lens, for example, in Japanese Patent Laid-Open No. 05-281449.

By providing the position sensor to detect the position of the lens, if the step-out phenomenon or the tooth skipping occurs, the position sensor can detect them and the lens position can be corrected. Further, by increasing a detection resolution of the position sensor high enough, even if a stop resolution becomes lower due to increased pitches of screws, the lens position can be accurately detected.

In such a technique, when the step-out phenomenon or the tooth skipping occurs, the number of drive pulses of the stepping motor that drives the lens can be calculated as follows:

the number of pulses=(lens target position−sensor detection position)×pulse conversion coefficient  (1)

Wherein, the pulse conversion coefficient is used to convert a position deviation of a lens detected by a lens position sensor into the number of pulses of a stepping motor. The pulse conversion coefficient is defined as follows:

pulse conversion coefficient=(the number of drive pulses per one rotation of motor)×(sensor resolution)/(feed screw pitch)  (2)

In a case where the lens is moved to a target position, including a case where a position is corrected when a lens position deviation occurs due to the step-out phenomenon or the tooth skipping, the stepping motor is driven by the number of drive pulses calculated according to the equations (1) and (2).

However, if the above-described technique is applied to the lens position control, the following problems occur.

First, in the lens movement mechanism, a backlash exists at an engagement part of the feed screw and the rack, or at a coupling part of a lens holding part and the rack. However, in the equations (1) and (2), elements of the backlash are not considered. In an actual movement mechanism, for example, in inverting a drive direction, a mismatch appears between the number of drive pulses of the stepping motor and the movement amount of the lens due to the backlash, and the lens cannot reach the target position. Further, an accumulated inaccuracy due to variations made at the time of manufacturing exists in the pitch of the feed screw. Accordingly, the pulse conversion coefficient calculated according to the equation (2) varies depending on the screws. Because of the screw pitch variations, similar to the above case, there is a mismatch between the number of drive pulses and the movement amount of the lens, so that the lens may not reach the target position.

SUMMARY OF THE INVENTION

The present invention is directed to provide an imaging apparatus configured to cause lenses to reach target positions even if a mismatch between the number of drive pulses and a movement amount of the lens exists.

According to an aspect of the present invention, an imaging apparatus includes a plurality of motors configured to be driven to move a lens in synchronization with a drive pulse, a position detection unit configured to detect positions of the lenses driven and moved by the plurality of motors, an operation unit configured to produce an output corresponding to an operation by a user, and a controller configured to receive the output from the position detection unit and control the plurality of motors. The controller supplies the number of drive pulses calculated based on a target position in moving the lens which is calculated according to the output from the operation unit and a lens position detected by the position detection unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 is a flowchart illustrating an operation to drive a focusing lens depending on a position of a zoom lens according to an exemplary embodiment of the present invention.

FIG. 4 is a flowchart illustrating processing to determine whether a position of a zoom lens is at a telephoto end or a wide-angle end according to an exemplary embodiment of the present invention.

DETAILED DESCRIPTION OF THE EMBODIMENT

An exemplary embodiment, features, and aspects of the invention will be described in detail below with reference to the drawings.

Figure 1:
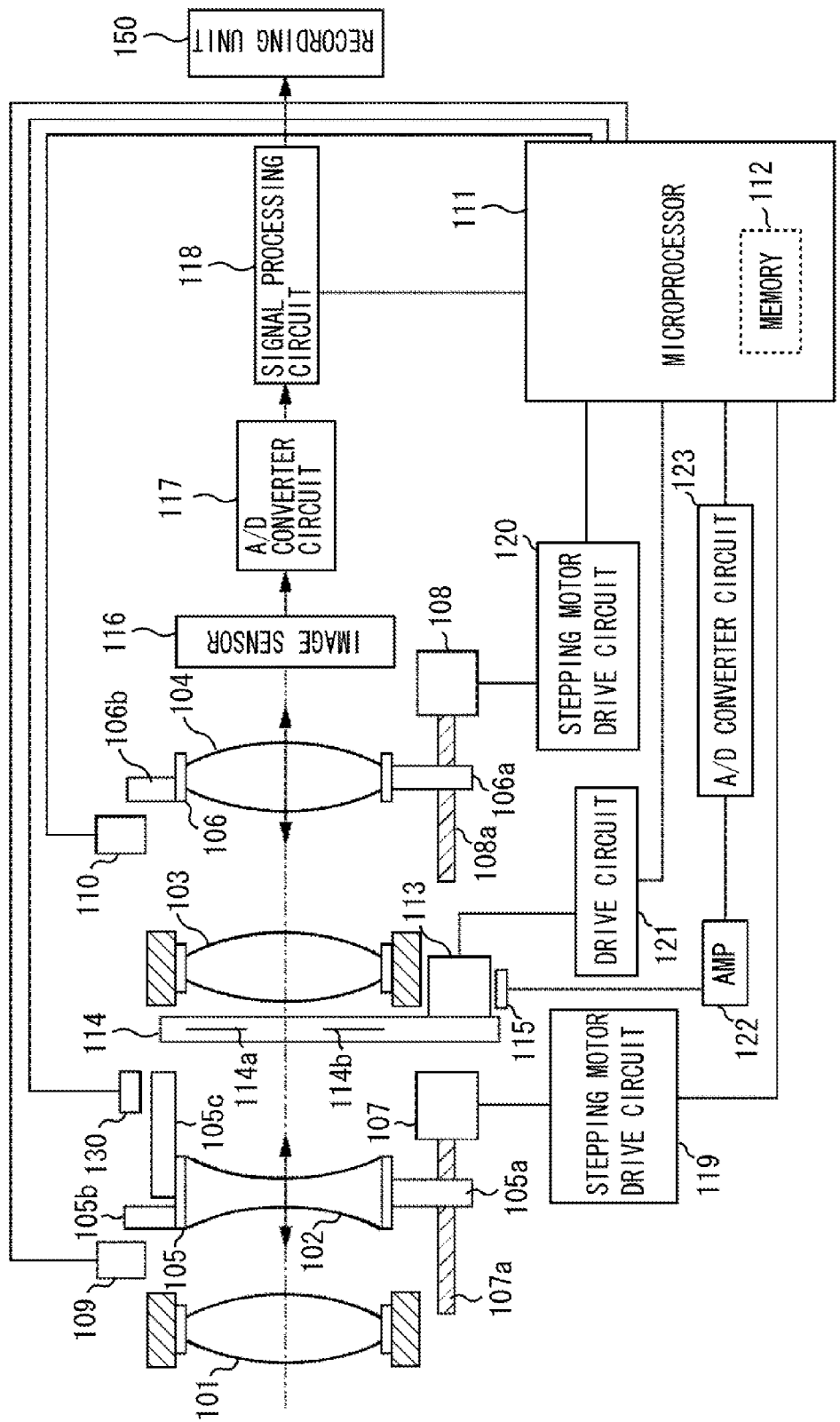
FIG. 1 is a view illustrating a configuration of an imaging apparatus that includes a lens position control device according to an exemplary embodiment of the present invention.

FIG. 1 is a view illustrating a configuration of an imaging apparatus that includes a lens position control device according to an exemplary embodiment of the present invention, such as a video camera.

The imaging apparatus includes an imaging optical system. The imaging optical system includes, in order from an object side (left side in FIG. 1), a field lens 101, a zoom lens 102 as a variable power lens, a diaphragm unit 114 that adjusts a light amount, an afocal lens 103, and a focusing lens 104 as a focusing lens. Such a lens configuration in which the focusing lens 104 is disposed at a rear side viewed from the object side is called a rear focusing lens. The rear focus lens is commonly used for today's video cameras, compact digital cameras, or the like. An image sensor 116 is a device that photoelectrically converts an object image formed by the imaging optical system, such as a charge-coupled device (CCD) sensor and a complementary metal-oxide semiconductor (CMOS) sensor.

The zoom lens 102 and the focusing lens 104 are held by a lens holding frame 105 and a lens holding frame 106 respectively. The lens holding frames 105 and 106 are guided in an optical axis direction by a guide shaft (not shown).

To the lens holding frames 105 and 106, a rack 105a and a rack 106a are provided respectively. The racks 105a and 106a engage with screw portions of screw shafts 107a and 108a that are output shafts of stepping motors 107 and 108 respectively. Each of the stepping motors is driven, the screw shafts are rotated, and the racks engage with the screw shafts. As a consequence, the lens holding frames are driven in the optical axis direction (in the arrow directions in FIG. 1). The stepping motors 107 and 108 are driven to move the lenses in synchronization with a drive pulse.

When the stepping motors 107 and 108 drive the zoom lens 102 and the focusing lens 104 to respective target positions, the lenses are set to reference positions for controlling the lens position at the time of startup of the imaging apparatus. Then, a drive signal having the number of drive pulses necessary to move the lenses from the reference positions to the target positions is input in the stepping motors. In the imaging apparatus, reference position sensors for detecting whether the zoom lens 102 and the focusing lens 104 are positioned at the reference positions respectively. In the exemplary embodiment, the reference position sensors are formed by photointerrupters 109 and 110, in which a light-emitting element and a light-receiving element are integrated. Between the light-emitting elements and the light-receiving elements of the photointerrupters 109 and 110, light shielding sections 105b and 106b placed on the lens holding frames 105 and 106 gain entrance. Thus, lights emitted from the light-emitting elements toward the light-receiving elements are blocked, and it is detected that the zoom lens 102 and the focusing lens 104 are positioned at the reference positions.

The light shielding section 105b is formed in a shape which enables a zone detection of the zoom lens 102, i.e., whether it is at a telephoto side or a wide-angle side. The light shielding section 106b is formed in a shape which enables a zone detection of the focusing lens 104, i.e., whether it is at a position to focus on a long-distance object or a position to focus on a close object.

On the lens holding frame 105 of the zoom lens 102, a position scale 105c that detects a position of the zoom lens 102 is fixed. In a lens barrel (not shown), at a position opposite to the position scale 105c, a position sensor 130 is fixed. On the position scale 105c, a scale pattern such as a magnetic pattern, or a light reflection pattern is formed in an optical axis direction. The position sensor 130 reads a magnetic signal, a light reflection signal, or the like corresponding to the position of the scale, and can detect the position of the zoom lens 102 in the optical axis direction. The detection signal of the position sensor 130 is input in a microprocessor 111, and used for the position control of the zoom lens 102. In the exemplary embodiment, the lens position sensor is provided in the zoom lens 102. It is because, in the rear focus lens, the zoom lens is larger and heavier than the focusing lens and a large motor torque is required, and further, the movement amount of the lenses is large and a high-speed drive is required. However, the present invention is not limited to the above-described configuration, but the position sensor may be provided in the focusing lens. Further, in the above description, as the motors to drive the focusing lens in synchronization with a drive pulse, the stepping motor is used. However, in the present invention, the other types of actuators, for example, a voice coil motor (VCM) can also be used.

The microprocessor 111 controls overall operations of the imaging apparatus in response to an input from a switch such as a power supply switch (not shown), a recording switch (not shown), or a zoom switch (not shown). In an internal memory 112 provided in the microprocessor 111, a position at the telephoto side (hereinafter, referred to as tele end) and a position at the wide-angle side (hereinafter, referred to as wide end) relative to the reference position of the zoom lens 102 are stored as data of positions of the zoom lens 102 by the position sensor 130. With respect to the reference position of the focusing lens 104, position data determined based on an object distance and a position of the zoom lens 102 is stored as the number of steps corresponding to a rotation amount of the stepping motor 108.

The stepping motors 107 and 108 are driven in response to forward-reverse signals which are input from the microprocessor 111 into stepping motor drive circuits 119 and 120 respectively. More specifically, the magnification operation and the focusing operation performed along with the magnification operation in the imaging optical system is performed by controlling the stepping motors 107 and 108 according to an electric cam method using cam locus data. The method is commonly used for video cameras.

The method for driving the stepping motors employed in the exemplary embodiment of the present invention is not limited to the above-described, but a 1-2 phase driving method or a 2-2 phase driving method can also be employed.

As compared to the position control using the position scale 105c and the position sensor 130, the position control using the drive pulse for driving the motors 107 and 108 that move the lenses in synchronization with the drive pulse provides lower resolution. In other words, if the output from the position sensor 130 is used, the position control can be more precisely performed than the position control performed by supplying the drive pulse.

The diaphragm unit 114 includes a galvanic actuator 113, diaphragm blades 114a and 114b that are opened and closed by the actuator 113, and a position detection element (Hall element) 115 that detects an open/close state of the diaphragm.

An electric signal from the image sensor 116 is converted from an analog signal into a digital signal by an analog-digital converter circuit (A/D converter circuit) 117, and input into a signal processing circuit 118. The signal processing circuit 118 transmits a video signal in the input electric signal to a recording unit 150. The microprocessor 111 feedback-controls the actuator 113 so that the input luminance signal component is always to be a normal value. In the control operation, an output from the position detection element 115 is amplified by an amplifier 122, converted from an analog signal to a digital signal by an A/D converter circuit 123, and input into the microprocessor 111 as information indicating an open/close position of the diaphragm. Based on the position information of the diaphragm, the microprocessor 111 transmits an open/close signal to a drive circuit 121 so that the luminance signal component is always to be a normal value to control the actuator 113. The microprocessor 111 can transmit an open/close signal for positioning the diaphragm position at a predetermined open/close position, to the drive circuit 121.

Figure 2:
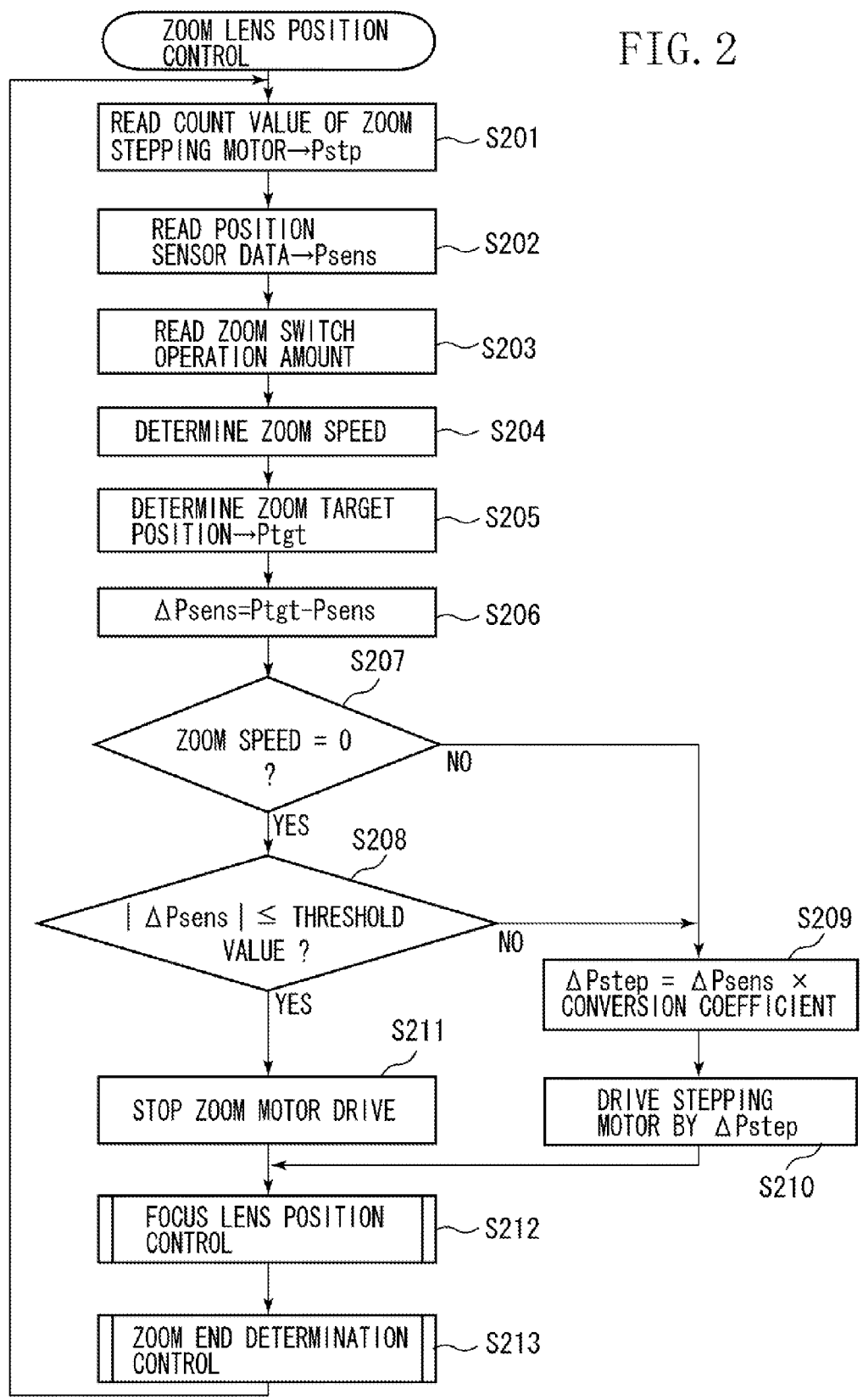
FIG. 2 is a flowchart illustrating an operation to drive a lens such that a difference between a target position in a lens position control and a lens position detected by a position sensor is to be a predetermined threshold or less according to an exemplary embodiment of the present invention.

Hereinafter, a position control is described. Even if a backlash exists in the movement mechanism, the position control can be performed by supplying to the motor the number of drive pulses calculated based on a target position in moving a lens calculated based on an output from the operation unit and a lens position detected by the position detection unit. Further, a flowchart in FIG. 2 is described. According to the flowchart, a lens drive control is repeatedly performed until a difference between the target position for the lens position control and the lens position detected by the position sensor reaches a threshold value or less.

The microprocessor 111 resets counters of drive pulses of the motors 107 and 108 with the photointerrupters 109 and 110, stores a difference from an absolute value encode of an output from the position detection element 115 as an offset, and performs control by associating the both values.

In step S201, the microprocessor 111 reads a pulse count value of the stepping motor 107 that drives the zoom lens 102 and stores in a random access memory (RAM)(Pstp). In step S202, the microprocessor 111 reads position detection data of the position sensor 130 for the zoom lens 102, and stores the data in a RAM (Psens). In step S203, the microprocessor 111 reads an operation amount of the zoom switch operated by a user. In an imaging apparatus such as a video camera, generally, a speed of zooming by the zoom lens 102 can be changed based on an operation amount of the zoom switch that functions as an operation unit. Accordingly, in step S204, the microprocessor 111 determines a speed of the zoom lens 102 corresponding to the operation amount of the zoom switch.

In step S205, based on the zoom lens position read in step S202 and the zoom speed determined in step S204, the microprocessor 111 determines a target position of the zoom lens 102 and stores the position in a RAM (Ptgt). In an imaging apparatus, generally, a control program is carried out once every cycle (1/60 seconds in NTSC-type video signal) of a vertical synchronizing signal of a video signal. Accordingly, a distance the lens moves at the above-described zoom speed in 1/60 second is added to or subtracted from the zoom lens position Psens depending on the drive direction in the zooming. A thus obtained value is the target position of the zoom lens 102. However, if the Ptgt exceeds a range from the wide end (Pwide) to the tele end (Ptele) of the zoom lens 102, the Ptgt is controlled such that the Ptgt is within the range from the Pwide to the Ptele.

In step S206, the microprocessor 111 calculates a difference between the target position Ptgt of the zoom lens 102 and the zoom position Psens, and stores the difference in a RAM (ΔPsens).

In step S207, the microprocessor 111 determines whether the zoom speed determined in step S204 is zero. If the zoom speed is not zero (NO in step S207), the driving is being performed. Then, the processing proceeds to step S209, and the microprocessor 111 calculates the number of drive pulses (ΔPstp) of the stepping motor 107. The ΔPstp can be calculated using the above-mentioned equations (1) and (2). In step S210, the microprocessor 111 drives the stepping motor 107 by the amount of ΔPstp. As described above, in the calculation of the ΔPstp, a backlash in the lens drive mechanism and variations of screw pitches are not considered. Accordingly, the lens position Psens after the driving is performed does not always match with the target position Ptgt of the zoom lens 102. The processing proceeds to step S212 and step S213, and the microprocessor 111 performs focusing lens position control and zoom end determination control, which will be described below. Then, the processing returns to step S201, and the microprocessor 111 continues the processing.

In step S207, if the zoom speed is zero, that is, a condition of zoom stop is satisfied (YES in step S207), the processing proceeds to step S208. In step S208, the microprocessor 111 determines whether the difference ΔPsens between the target position Ptgt of the zoom lens 102 and the zoom position Psens is equal to a threshold or less. In this case, the threshold is determined by considering, for example, an amount of a backlash in the movement mechanism or a variation in the lens position due to turning on and off the electric power of the motor. More specifically, the threshold is determined, for example, based on a variation of stop positions at the time of turning on the electric power or at the time of turning off the electric power of the motor. While the resolution of the lens position control by the stepping motor 107 is to be considered, if the pulse of the motor is set to about 1 to 1.5 pulses in a 1-2 phase driving, a failure in the control such as hunting can be usually avoided. In the hunting, the lens repeatedly moves back and forth around the target position of the lens In step S208, if it is determined that the ΔPsens exceeds the threshold (NO in step S208), the zoom lens position has not reached the target position. Then, the processing proceeds to step S209 and step S210, and the microprocessor 111 continues to drive the stepping motor 107. As described above, the microprocessor 111 repeatedly implements the driving of the stepping motor 107 until the ΔPsens becomes a value equal to the threshold or less. As a result, the zoom lens can move to the target position Ptgt with an error equal to or less than the threshold. In step S208, if it is determined that the ΔPsens is equal to the threshold or less (YES in step S208), the processing proceeds to step S211. In step S211, the microprocessor 111 stops the driving of the stepping motor 107. In steps S212 and S213, the microprocessor 111 performs the focus position control and the zoom end determination control, and the processing returns to step S201.

As described above, in step S208, the microprocessor 111 determines whether the difference ΔPsens between the target position Ptgt in the zoom lens position control and the zoom position Psens detected by the position sensor 130 is equal to the threshold or less. If the difference ΔPsens is equal to the threshold or more, in steps S209 and S210, the microprocessor 111 repeatedly implements the drive control of the stepping motor 107 according to the equations (1) and (2). As a consequence, even if a mismatch between the number of drive pulses and the lens movement amount exists due to a backlash in the drive mechanism or variations in screw pitches, the microprocessor 111 can accurately move the zoom lens 102 to the target position with an error equal to the threshold or less.

Hereinafter, the focusing lens position control mentioned in step S212 in FIG. 2 is described with reference to a flowchart in FIG. 3.

In controlling the focusing lens position, if the lens does not reach the target position, the following problems occur in the imaging apparatus. As described above, for video cameras, the lens type called rear focus lens is generally used. The rear focus lens has such a characteristic that in a magnification operation, in order to maintain an in-focus state, it is necessary to drive a variable power lens and a focusing lens keeping a certain positional relationship (cam locus). As in the above case, when the lens does not reach the target position in the lens driving operation, it is not possible to maintain the positional relationship between the variable power lens and the focusing lens. Then, for example, an image of an object is not sharply focused in the magnification operation, and the performance of the imaging apparatus is decreased.

In step S301, the microprocessor 111 reads a pulse count value of the stepping motor 108 that drives the focusing lens 104. In the exemplary embodiment, the focusing lens 104 is not provided with a sensor such as the position sensor 130. Accordingly, the pulse count value read in step S301 is used as focus position data. In step S302, the microprocessor 111 reads cam locus data of the locus which the rear focus lens is about to track. By using the cam locus data, a focusing lens position corresponding to the zoom lens position can be calculated to maintain the current in-focus state. In step S303, the microprocessor 111 determines whether the stepping motor 107 that drives the zoom lens 102 is in a drive-stop state. If the stepping motor 107 is in operation (NO in step S303), the processing proceeds to step S304. In step S304, the microprocessor 111 calculates a focus position corresponding to the zoom target position Ptgt determined in step S205 in FIG. 2 from the cam locus data, and sets the focus position as a focus target position. In step S306, the microprocessor 111 determines whether the focus lens position matches with the target position. If the focus lens position does not match with the target position (NO in step S306), the processing proceeds to step S307. In step S307, the microprocessor 111 drives the stepping motor 108 such that the focusing lens 104 moves to the target position and the processing proceeds to step S213 in FIG. 2. On the other hand, if it is determined that the focus lens position matches with the target position (YES in step S306), the processing proceeds to step S308. In step S308, the microprocessor 111 stops the driving operation of the stepping motor 108, and the processing proceeds to step S213.

In step S303, if it is determined that the stepping motor 107 that drives the zoom lens 102 is in the drive-stop state, the zoom lens 102 is suspended. However, as described above, the zoom lens position Psens does not always match with the zoom target position Ptgt, and the zoom lens 102 is suspended at a position having an error of a threshold or less. Meanwhile, in the processing so far, the focus target position is calculated as the position corresponding to the zoom target position Ptgt on the cam locus. Accordingly, when the zoom lens position does not match with the zoom target position Ptgt, the position is out of the cam locus that maintains the in-focus state. Especially, if the imaging apparatus operates in a manual focus mode, the imaging apparatus does not automatically perform the focusing operation. In such a case, an image of the object is out of focus by the amount the zoom lens position deviates from the cam locus, and the performance of the imaging apparatus is decreased. To prevent such decrease of the performance, in step S303, if it is determined that the stepping motor 107 that drives the zoom lens 102 is in the drive-stop state (YES in step S303), the processing proceeds to step S305. In step S305, the microprocessor 111 calculates from the cam locus data a focus position corresponding to the position detection data Psens detected by the position sensor 130 for the zoom lens 102. The microprocessor 111 determines the focus position to be a focus target position, and the processing proceeds to step S306. The succeeding processing is similar to those described above, and accordingly, their descriptions are omitted.

As described above, when the zoom lens 102 is in the drive-stop state, the microprocessor 111 controls the focusing lens 104 to move to the focus target position based on the position detection data Psens of the position sensor 130 for the zoom lens 102. In other words, based on the remaining amount ΔPsens at the time the zoom lens 102 is moved to the zoom target position Ptgt, the microprocessor 111 moves the focusing lens 104 such that the positional relationship on the cam locus for maintaining the in-focus state is retained. By the above operation, the image of the object can be prevented from becoming out of focus, and the performance of the imaging apparatus can be ensured.

In the exemplary embodiment, the focusing lens 104 is moved based on the target position of the variable power lens and the lens position detected by the position detection unit. On the other hand, if a detection unit that detects a position of the focusing lens 104 is provided, based on a target position of the focusing lens 104 and a lens position detected by the position detection unit, the zoom lens 102 can be moved (zoom end determination control).

Hereinafter, the zoom end determination control illustrated in step S213 in FIG. 2 is described with reference to a flowchart in FIG. 4.

In the control of the imaging apparatus, in particular, when the variable power lens is at a tele end or a wide end that are ends of a range the variable power lens can move, certain control can be performed. For example, if the variable power lens is at the tele end or the wide end, display of a shape or a color in a zoom position display on a monitor screen, or the like is changed. Further, if the imaging apparatus has an electronic zooming function for electronically magnifying or demagnifying a captured image, control can be performed which switches between an optical zooming operation and an electronic zooming operation depending on whether a position of the variable power lens matches with the tele end or the wide end. However, as described above, since a backlash occurs in the lens moving mechanism, even if the lens driving is suspended, the position of the lens can be frequently varied by the amount of the backlash with a slight impact. When the variable power lens is at the tele end or the wide end, if the above-described lens position deviation occurs, the operation of the imaging apparatus becomes abnormal. More specifically, an abnormal behavior can appear in the imaging apparatus. For example, even though the user does not perform any magnification operation, a zoom position indication is changed or the electronic zooming operation is released. To solve the problem, in the exemplary embodiment, when the lens is controlled to be at the end of the movable range, even if an output result by the position detection unit is changed in a state the motor is not operated, it is determined that the lens remains at the end of the movable range.

In step S401, the microprocessor 111 determines whether the stepping motor 107 that drives the zoom lens 102 is in operation. If it is determined that the zoom lens 102 is in operation (YES in step S401), the processing proceeds to steps S408 and S409. In the steps, the microprocessor 111 clears a tele end flag and a wide end flag. The tele end flag indicates the zoom lens position is at the tele end and the wide end flag indicates the zoom lens position is at the wide end. These flags are referred to in another program for controlling the imaging apparatus, for example, in performing control to change display of a shape or color in a zoom position display on a monitor screen when the zoom lens is at the tele end or the wide end. Depending on whether these flags are set or not, the shape or color in the zoom position display is controlled to change.

Further, these flags can be referred to in control processing for switching between an optical zooming operation and an electronic zooming operation. In such a case, depending on whether these flags are set or not, the control is performed to switch between the optical zoom and the electronic zoom.

In step S401, if it is determined that the stepping motor 107 is suspended (NO in step S401), the processing proceeds to step S402. In step S402, the microprocessor 111 determines whether the target position Ptgt of the zoom lens 102 matches with the tele end (Ptele) of the zoom lens 102. In the exemplary embodiment, the zoom lens position data such as the Ptgt becomes larger as the position of the lens comes closer to the tele end. The determination is performed based on whether the Ptgt is equal to the Ptele or more. If it is determined that the Ptgt is equal to the Ptele or more (YES in step S402), the processing proceeds to step S406. In step S406, the microprocessor 111 sets the tele end flag, and the processing returns to step S201 in FIG. 2. On the other hand, if it is determined that the Ptgt is less than the Ptele (NO in step S402), the processing proceeds to step S403. In step S403, the microprocessor 111 clears the tele end flag, and the processing proceeds to step S404. In step S404, the microprocessor 111 determines whether the target position Ptgt of the zoom lens 102 matches with the wide end (Pwide) of the zoom lens 102 (whether the Ptgt is equal to the Pwide or less). If it is determined that the Ptgt is equal to the Pwide or less (YES in step S404), the processing proceeds to step S407. In step S407, the microprocessor 111 sets the wide end flag, and the processing returns to step S201 in FIG. 2.

On the other hand, if it is determined that the Ptgt is greater than the Pwide (NO in step S404), the processing proceeds to step S405. In step S405, the microprocessor 111 clears the wide end flag, and the processing returns to step S201 in FIG. 2.

When it is determined whether the zoom lens position is at the tele end or at the wide end in steps S402 and S404 as described above, the determination is made based on whether the zoom motor is in operation and whether the target position Ptgt of the zoom lens 102 reaches the tele end or the wide end. The position detection data Psens of the position sensor 130 for the zoom lens 102 is not used. Accordingly, after the tele end flag or wide end flag is set in step S406 or step S407, while the stepping motor 107 is not in operation, a backlash in the lens drive mechanism does not affect the determination result in step S402 or S404. While the stepping motor 107 is not in operation, even if the position detection data Psens of the position sensor 130 for the zoom lens 102 is varied due to the backlash in the lens drive mechanism or the like, it is determined that the zoom lens 102 is still at the end position. As a result, as long as the user does not intentionally operate the zooming switch, the state that the tele end flag or the wide end flag is set is maintained. Accordingly, the problem that the zoom position indication is changed even if the user has not performed a magnification operation or the zooming operation is released, can be prevented.

More specifically, when the lens is at the tele end or the wide end, even if the lens position is varied due to the backlash in the lens driving mechanism or the like while the lens is not driven, the imaging apparatus can be prevented from abnormally operating.

As described in the description of the zoom lens position control in FIG. 2, when the stepping motor 107 is not in operation, an error of the zoom lens position Psens is controlled to be within the range of the threshold with respect to the zoom target position Ptgt. Accordingly, when it is determined using the zoom target position Ptgt whether the zoom lens position is at the tele end or wide end, the error is negligible, and the error does not affect the operation and the performance of the imaging apparatus.

As described above, if the mismatch between the number of drive pulses of the stepping motor and the lens movement amount occurs due to a backlash in the drive mechanism or variations in screw pitches, it is possible to accurately move the lens to the target position within the range of the predetermined error equal to the threshold or less. Further, if the error is observed, the lens position relationship to maintain the in-focus state on the cam locus can be retained. Accordingly, an image of an object can be prevented from becoming out of focus and the performance of the imaging apparatus can be ensured. Further, when the lens is at the tele end or the wide end, even if the lens position is varied due to the backlash in the lens drive mechanism or the like, the imaging apparatus can be prevented from abnormally operating.

Further, if the threshold is set based on the amount of the backlash in the lens drive mechanism, for example, such that the threshold exceeds the amount of the backlash, an unstable operation such as hunting in which the lens repeatedly moves back and forth around the target position of the lens can be avoided and the stability in the control can be increased. In such a case, the error of the amount of the threshold corresponding to the backlash amount remains, however, it is possible to perform the control such that the variations in screw pitches do not affect the position control accuracy.

Further, in the lens movement mechanism using the stepping motors and the screws, even if the electric supply to the motors is turned off, the lens position can be maintained. Accordingly, while the lens is not in operation, by turning off the electric supply to the motors, power consumption can be reduced. By the turning-on/off operation of the motors, the lens position is slightly varied. With respect to this problem, the variation of the lens position is considered when determining the threshold, so that it is possible to prevent the lens control from becoming unstable by the turning on/off the power supply to the motors.

Further, in a case where the above-described lens position control is applied to the variable power lens in the rear focus lens, when the distance between the lens target position and the lens position is equal to the threshold or less and the driving of the motor is stopped, the position of the focus lens is moved. Accordingly, the predetermined positional relationship is retained to maintain the in-focus state according to the lens target position and the output result of the position sensor 130. Thus, an image of an object can be prevented from becoming out of focus and the performance of the imaging apparatus can be ensured.

Further, when the lens is at the tele end or the wide end, even if the lens position is varied due to the backlash in the lens driving mechanism or the like while the lens is not driven, the control is performed considering that the lens remains at the tele end or the wide end. Accordingly, the imaging apparatus can be prevented from making an abnormal operation, such that the zoom position indication is changed, or the electronic zooming operation is released while the user has not performed the magnification operation.

While the present invention has been described with reference to the exemplary embodiment, it is to be understood that the invention is not limited to the disclosed exemplary embodiment. The scope of the following claims is to be accorded the broadest interpretation so as to encompass all modifications, equivalent structures, and functions.

This application claims priority from Japanese Patent Application No. 2007-340393 filed on Dec. 28, 2007 which is hereby incorporated by reference herein in its entirety.

What is claimed:

1. An imaging apparatus comprising:
 a motor configured to move a lens in synchronization with a drive pulse;
 a position detection unit configured to detect a position of the lens corresponding to a position of a position scale; and
 a controller configured to control the motor by supplying the motor with a number of drive pulses for moving the lens,
 wherein the number of drive pulses is calculated based on both of a target position of the lens and the position of the lens detected by the position detection unit, and
 wherein, while the lens moves, the target position of the lens is calculated repeatedly by the controller and the position of the lens is detected repeatedly by the position detection unit.

2. The imaging apparatus according to claim 1, wherein, the controller repeats supplying the motor with drive pulses until a distance between the target position and the position of the lens reaches a predetermined threshold or less.

3. The imaging apparatus according to claim 2, further comprising a movement mechanism that includes a feeding screw and a rack that engages with the feeding screw,
 wherein the feeding screw is rotated by the motor to move the lens, and
 wherein the predetermined threshold is determined based on a backlash amount of the movement mechanism.

4. The imaging apparatus according to claim 2, wherein the predetermined threshold is determined based on a variation in a stop position at a time that electricity to the motor is turned on and off.

5. The imaging apparatus according to claim 1, wherein the controller controls a focusing lens based on the target position.

6. The imaging apparatus according to claim 1,
 wherein the controller controls the motor to move a zoom lens within a movable range; and
 wherein, in a case where the zoom lens is controlled to be at an end of the movable range, the controller determines that the zoom lens remains at the end within the movable range, even if the signal from the position detection unit is changed when the motor is not in operation.

7. The imaging apparatus according to claim 1, further comprising a movement mechanism including a feeding screw that is rotated by operation of the motor to move the lens and a rack that engages with the feeding screw.

8. The imaging apparatus according to claim 1, wherein the motor comprises a voice coil motor (VCM).

9. The imaging apparatus according to claim 1, wherein the target position is stored in a memory.

10. The imaging apparatus according to claim 1, further comprising a reference position sensor configured to detect a zoom lens is positioned at a reference position.

11. The imaging apparatus according to claim 10, wherein a counter of drive pulses of the motor is reset by using the reference position sensor.

12. The imaging apparatus according to claim 1, wherein the position scale includes a magnetic pattern.

13. The imaging apparatus according to claim 1, wherein the position scale includes a light reflection pattern.

14. The imaging apparatus according to claim 1, wherein the lens is a zoom lens and, wherein the target position is controlled so that the target position is within a range from a wide end to a tele end of the zoom lens.

15. The imaging apparatus according to claim 1, wherein the target position is calculated periodically.

16. The imaging apparatus according to claim 1, wherein the target position is calculated in synchronism with a video signal.

17. The imaging apparatus according to claim 1, wherein, when a speed is zero, the controller supplies the motor with a drive pulse so that a distance between the target position and the position of the lens becomes a predetermined threshold or less.

18. The imaging apparatus according to claim 1, wherein the target position is calculated based on the position of the lens and a speed.

19. The imaging apparatus according to claim 18, wherein the target position is calculated based on a distance that the lens moves in $\frac{1}{60}$ second, and
 wherein the distance that the lens moves in $\frac{1}{60}$ second is added to or subtracted from the position of the lens.

20. The imaging apparatus according to claim 1, wherein, when a speed is zero, the controller determines whether a difference between the target position and the position of the lens is equal to a threshold or less.

21. The imaging apparatus according to claim 20, wherein the threshold is set so that the lens does not repeatedly move back and forth around the target position.

22. The imaging apparatus according to claim 20, wherein the threshold exceeds an amount of a backlash in a movement mechanism of the lens.

23. A method for controlling an imaging apparatus comprising:
 moving a lens with a motor in synchronization with a drive pulse;
 detecting, using a position detecting unit, a position of the lens corresponding to a position of a position scale; and
 controlling, using a controller, the motor by supplying a number of drive pulses for moving the lens,
 wherein the number of pulses is calculated based on a target position of the lens and the position of the lens is detected by the position detection unit, and
 wherein, while moving the lens, the target position of the lens is calculated repeatedly by the controller and the position of the lens is detected repeatedly by the position detection unit.

* * * * *